United States Patent
Amiel et al.

(10) Patent No.: US 6,656,640 B1
(45) Date of Patent: Dec. 2, 2003

(54) NON-SINTERED ELECTRODE WITH THREE-DIMENSIONAL SUPPORT FOR A SECONDARY ELECTROCHEMICAL CELL HAVING AN ALKALINE ELECTROLYTE

(75) Inventors: Olivier Amiel, Angouleme (FR); Inés Belkhir, Angouleme (FR); Jean-Pierre Freluche, Angouleme (FR); Nathalie Pineau, Roullet (FR); Christian Dupuy, Fontenille (FR); Stéphane Babin, Ruelle sur Touvre (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/708,652

(22) Filed: Nov. 9, 2000

(30) Foreign Application Priority Data

Nov. 10, 1999 (FR) .......................................... 99 14 116

(51) Int. Cl.⁷ ................................................. H01M 4/80
(52) U.S. Cl. ........................ 429/235; 429/233; 429/239; 429/240; 429/234; 429/211; 429/223; 429/218.2; 29/2

(58) Field of Search .................................. 429/235, 233, 429/239, 240, 234, 211, 223, 218.2; 29/2

(56) References Cited

FOREIGN PATENT DOCUMENTS

| JP | 62-133670 | | 6/1987 |
| JP | 2-72564 | * | 3/1990 |
| JP | 8-203514 | | 8/1996 |
| WO | WO 99/38221 | | 7/1999 |

* cited by examiner

*Primary Examiner*—Laura Weiner
(74) *Attorney, Agent, or Firm*—Sughrue Mion, PLLC

(57) ABSTRACT

The invention provides an electrode comprising a porous three-dimensional conductive support containing an electrochemically active material, said support having at least a first edge connected to a connection piece and at least a second edge substantially parallel to said first edge, and means for preventing said active material disposed along said second edge from moving. Said means is selected from: a piece having a U-shaped fold placed stride said second edge; a surface covering; and treatment to modify the texture of said support. The electrode is used as a positive electrode in a second electrochemical cell of the nickel metal hydride type.

15 Claims, 3 Drawing Sheets

NON-SINTERED ELECTRODE WITH THREE-DIMENSIONAL SUPPORT FOR A SECONDARY ELECTROCHEMICAL CELL HAVING AN ALKALINE ELECTROLYTE

The present invention relates to an electrode of the non-sintered type including a three-dimensional current collector and suitable for use in a secondary electrochemical cell having an alkaline electrolyte, in particular a cell of the nickel cadmium or of the nickel metal hydride type. It relates in particular to a positive nickel electrode whose conductive support is constituted by a metal foam.

BACKGROUND OF THE INVENTION

Until recently, electrochemical cells having an alkaline electrolyte included electrodes with a conductive support having active material deposited electrochemically or chemically into its pores by a plurality of successive precipitation operations. Unfortunately, that method of manufacture is lengthy and expensive. To satisfy the increasing needs of users, such electrodes can nowadays be made in a different manner.

An electrode having a non-sintered conductive support, also referred to as a pasted or plasticized electrode comprises a current collector which is coated in a paste containing the electrochemically active material and a binder, which are usually associated with one or more conductive materials. The conductive support can be two-dimensional or plane, as is the case for a solid or perforated foil, an expanded metal, a grid, or a cloth. The conductive support can also be three-dimensional such as a carbon or metal foam or felt which also acts as a structure for receiving the electrochemically active material, imparting mechanical strength to the electrode, and acting as a current collector. With three-dimensional current collector electrodes, the paste is introduced into the porous support which is then cut to the desired size. Cutting leaves strands of metal coming from the fibers constituting the support apparent at its edges. These subsequently run the risk of perforating the separator and giving rise to short circuits.

While an electrochemical cell is being assembled, the electrode needs to be electrically connected to the current outlet terminal. This connection is generally performed by means of a connection piece which is fixed firstly to the internal portion of the terminal and secondly to the conductive support of the electrode. The connection piece is preferably welded to the support so as to ensure that the electrical contact is reliable. When the electrode support is a three-dimensional support of large pore volume, its edge has neither the solidity nor the quantity of metal necessary to enable a connection piece to be welded directly thereto. Various solutions have been proposed for reinforcing the edge of the support prior to fixing the connection piece thereto.

The electrodes of opposite polarity are then assembled face to face on opposite sides of a separator. It is common practice, particularly in cells having spiral-wound electrodes, to offset electrodes of opposite polarities vertically relative to one another to a small extent so that the electrical connections between the electrodes of each polarity and the corresponding terminal are made at opposite ends of the roll.

In cells of the nickel metal hydride type, it has been found that the positive active material moves slowly or "creeps" from the core of the electrode towards its surface and towards the edge of the electrode which does not carry the connection piece. After a certain length of time, the positive material projects from the edge of the separator and can come into contact with the negative electrode and/or with the negative connection piece. This contact leads under all circumstances to a leakage current being established which means that the cell has a high level of self-discharge, and it can also lead to short circuits. This phenomenon is particularly present with electrodes of large surface area used in high power cells that need to be capable of discharging quickly (complete discharge in less than 1 hour), such as those intended for cordless tools or for electric vehicles, for example.

Document JP-2-72564 describes an alkaline storage cell having spiral-wound electrodes such that the anode and the cathode project from respective opposite ends, one connection piece being welded to each projecting support. The cathode comprises a porous three-dimensional support into which the active material is introduced in the form of a paste. Internal short circuits can arise because of the positive active material swelling due to gas being given off during cycling. Such short circuits occur in the zone of the cathode which is adjacent to where the anode support projects. In order to remedy that problem, that document recommends introducing an adhesive into said zone that withstands the alkali and that replaces the active material to act as a barrier and prevent the active material from moving towards the anode connection piece. During manufacture of the electrode, the location reserved for the adhesive is marked. The support is filled with the paste containing the active material, then dried, compressed, and cut up. A molten resin is then cast into the reserved zone and hardens on cooling.

That solution presents various drawbacks. Firstly, the zone containing the adhesive must be free from any active material, which makes it necessary either to use a mask as described in that document, or else to remove active material that has penetrated therein during manufacture. Neither of those solutions is suitable for use on an industrial scale. Furthermore, the metal strands that are due to the cutting-out run the risk subsequently of giving rise to short circuits. The adhesive that is to be found inside the support does not enable such short circuits to be avoided.

OBJECTS AND SUMMARY OF THE INVENTION

An object of the present invention is thus to propose another solution for further reducing the risk of short circuits in an electrode of the non-sintered type and having a three-dimensional support.

A particular object of the invention is to propose an electrode of the non-sintered type with a three-dimensional support in which the phenomenon of creep of the active material over time is controlled so that no increase in self-discharge is observed throughout the lifetime of the cell.

The present invention provides an electrode comprising a porous three-dimensional conductive support containing an electrochemically active material, said support having at least a first edge connected to a connection piece and at least a second edge substantially parallel to said first edge, and means for preventing said active material disposed along said second edge from moving, wherein said means is selected from: a piece having a U-shaped fold placed stride said second edge; a surface covering; and treatment to modify the texture of said support.

With respect to an electrode, the term "edge" is used to designate that zone of the electrode which is constituted by its edge proper plus its surface margins contiguous therewith.

In a first embodiment of the invention, said means is a piece having a U-shaped fold placed astride said second edge.

Said piece can be selected from a tape and a portion of the separator. A piece in the form of a tape folded into a U-shape in the longitudinal direction can be fitted, or else a portion of the separator specially designed for this purpose can be used, which portion is folded over the edge of the electrode. Under such circumstances, the piece is made of the non-woven polyolefin material of the separator.

In a variant, said tape is made of an electrically insulating material. Said insulating material is preferably selected from a polymer, e.g. a non-woven material, or a cellulose compound such as paper.

By way of example, the selected polymer can be a polyolefin such as polyethylene or polypropylene, or it can be a polyamide.

In another variant, said tape is made of metal. The metal tape can be made of nickel, nickel-plated steel, or stainless steel, for example.

Said piece is preferably fixed on said electrode. It can be stuck on by means of adhesive or clips, and if it is a metal strip, it can be welded directly.

In a second embodiment of the invention, said means is a surface covering on said support. Said covering can be deposited by being sprayed or spread onto the surface of said support. The covering covers the surface of the support but does not penetrate into its pores.

Said covering is preferably selected from a polymer such as polytetrafluroethylene (PTFE), an elastomer such as styrene butadiene rubber (SBR), a varnish, a paint, or a paraffin.

In a third embodiment, said means constitutes treatment which modifies the texture of said support. In which case it consists in reducing the porosity of the support so as to create a barrier which retains the active material. Said treatment can be selected from compression and welding.

In a variant, said treatment further comprises folding said second edge. The support cleared of active material can be folded over the portion of the support containing active material, and then rolled to the thickness of the electrode.

Said three-dimensional conductive support is selected from a foam and a felt. Said conductive support is preferably a nickel foam.

Said electrochemically active material is a nickel hydroxide. The term "nickel hydroxide" means a hydroxide of nickel or a hydroxide containing mostly nickel hydroxide together with at least one syncrystallized hydroxide of some other element (Zn, Co, Ca, Cd, Mg, Mn, Al, . . . ).

The present invention also provides a secondary electrochemical cell including such an electrode which is a nickel positive electrode. Such cells are mainly cells having an alkaline electrolyte such as cells of the nickel metal hydride type, nickel cadmium type, nickel iron type, or nickel zinc type.

In a preferred embodiment of the invention, the secondary electrochemical cell is a cell of the nickel metal hydride type.

The present invention has the advantage of creating a mechanical barrier which prevents or contains displacement of the active material of the positive electrode. In addition, the barrier prevents the separator from being perforated by sharp strands projecting from the support.

The invention also has the advantage of enabling the active material contained in the support along the second edge to operate at least to some extent, with efficiency of about 40%, thereby conserving high capacity for the electrode of the invention.

BRIEF DESCRIPTION OF THE DRAWINGS

The invention will be better understood and other advantages and features will appear on reading the following description of embodiments given by way of non-limiting example and accompanied by drawings, in which.

MORE DETAILED DESCRIPTION

EXAMPLE 1

A nickel electrode A of the invention was made as follows.

The current collector was a nickel foam of porosity not less than 95%. A paste containing the electrochemically active material, which was nickel hydroxide and a binder, was introduced into the pores of the foam. The porous support containing the active material was then cut up to obtain an active strip that was about 250 mm long and about 32 mm wide.

Figure 1:
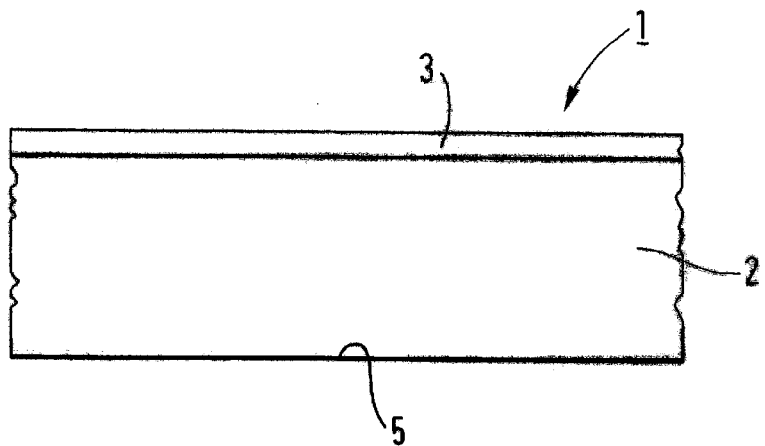
FIG. 1 shows an electrode of the invention.
Figure 2:
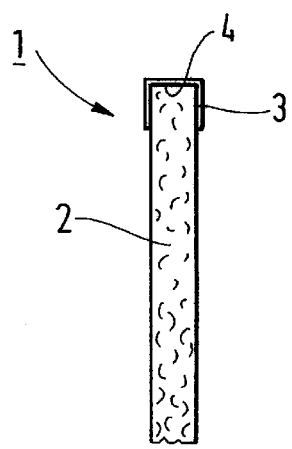
FIG. 2 is a section view through the electrode of FIG. 1.

To make the electrode 1 shown in FIGS. 1 and 2, an adhesive tape 3 of polypropylene was used having a width of about 4 mm and a thickness of about 80 $\mu$m. Tests were also performed using a tape of smaller thickness, e.g. 30 $\mu$m, and the results obtained were satisfactory. The tape was folded as a U-shape placed astride the longitudinal edge 4 of the active strip 2.

Figure 3:
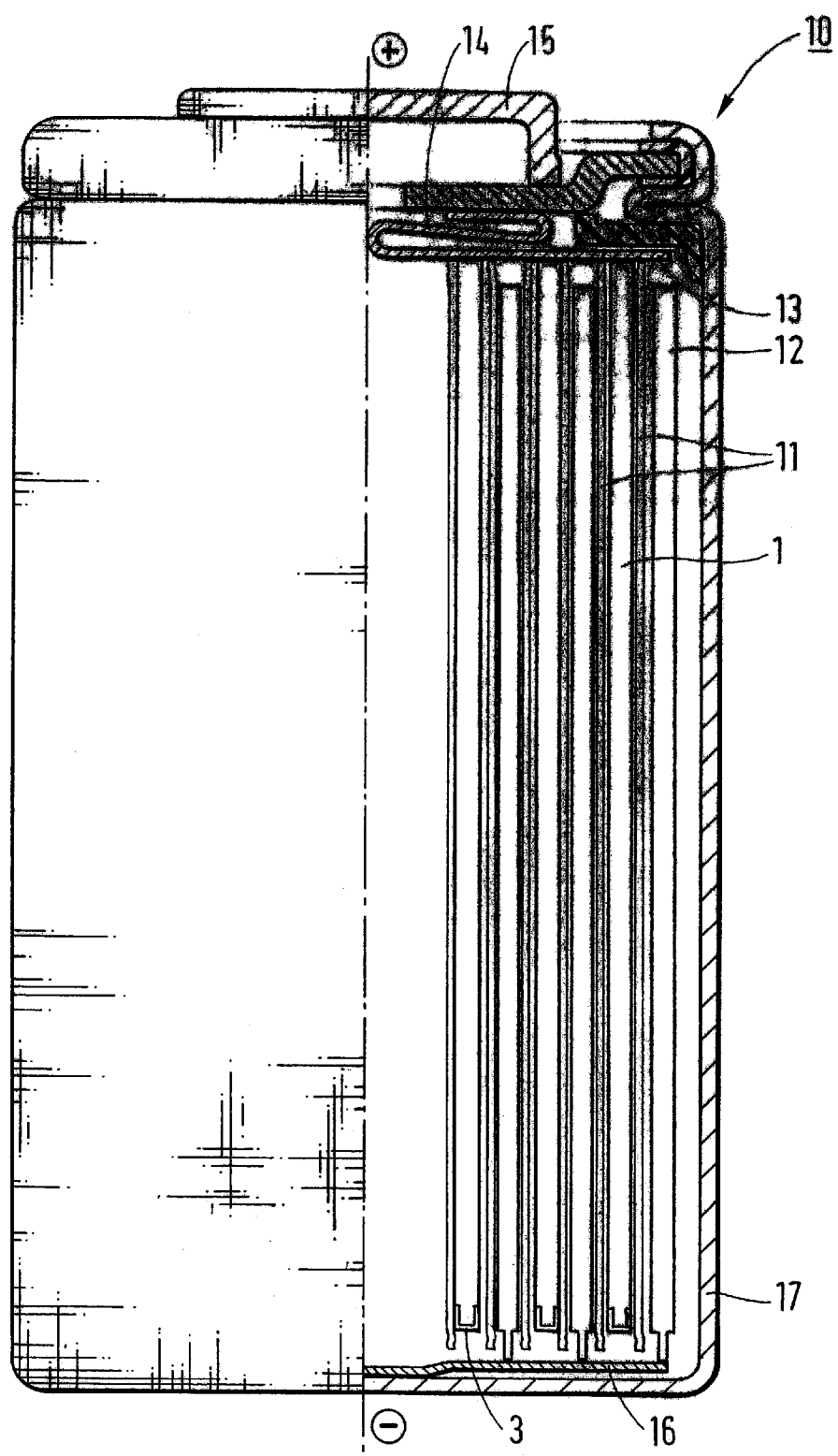
FIG. 3 is a section view through a secondary electrochemical cell including a positive electrode of the present invention.

A secondary electrochemical cell 10 of the cylindrical nickel metal hydride type and of Cs format (diameter 22 mm; height 42 mm) was made with a nominal capacity of 3 Ah, as shown in section in FIG. 3, and it was assembled by using the previously made nickel electrode 1.

The positive electrode 1, a polyolefin separator 11, and a negative electrode 12 whose electrochemically active material was based on a hydridable alloy were superposed. The electrochemical stack was spiral-wound to form a roll.

A connection piece 13 was welded to the-edge of the spiral-wound positive electrode 1, said piece being in the form of a nickel-plated steel disk electrically connected by means of a tab 14 to the current outlet terminal constituted by the cover 15. The negative electrode 12 was electrically connected by means of a nickel-plated steel disk 16 to the cylindrical can 17 of the cell 10.

After being inserted in the can 17, the roll was impregnated with an alkaline electrolyte comprising a mixture of potassium hydroxide (KOH), sodium hydroxide (NaOH), and lithium hydroxide (LiOH) in an aqueous solution. After electrolyte had been added, the cell 10 was closed in leakproof manner by crimping the cover 15 onto the can 17.

EXAMPLE 2

Figure 4:
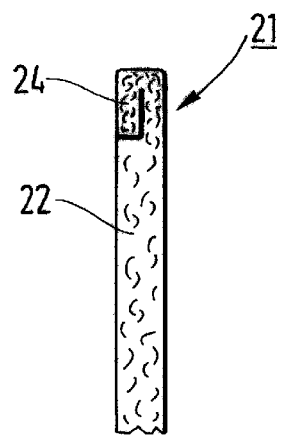
FIG. 4 is a section view through a variant of the electrode of the invention.

An electrode B of the invention was made as follows. After cutting out an active strip 22 having a length of approximately 250 mm and a width of approximately 34 mm, the edge 24 of the support was cleaned of the active material it contained by ultrasound over a width of about 2 mm. The support free from active material was then folded down onto a portion of the support still containing active material and it was rolled to the same thickness as the electrode 21, as shown in FIG. 4. In this zone, porosity had therefore been divided by about two. An electrode was obtained having the same dimensions as the electrode of Example 1.

A cell analogous to that of Example 1 but containing electrode B was assembled.

EXAMPLE 3

By way of comparison, a cell analogous to that of Example 1 was assembled but containing an electrode C constituted solely by the cutout active strip 2 as described in Example 1.

EXAMPLE 4

Electrode D of the invention was made as follows. After cutting out the active strip as described in Example 1, a 4 mm wide strip of paper was placed astride the edge of the electrode and fixed thereto by adhesive.

EXAMPLE 5

An electrode E of the invention was made as follows. After cutting out the active strip as described in Example 1, a 4 mm wide strip of non-woven polyamide material was fixed astride the edge of the electrode by adhesive.

EXAMPLE 6

An electrode F of the invention was made as follows. After cutting out the active strip as described in Example 1, a layer of PTFE was deposited by spraying.

EXAMPLE 7

An electrode G of the invention was made as follows. After cutting out the active strip as described in Example 1, the electrode was inserted into a polyolefin separator that had been folded in half to form a jacket. A negative electrode was placed on either side of the positive electrode in the separator and the electrochemical stack was spiral-wound.

The previously assembled cells containing electrodes A to C were compared.

Figure 5:
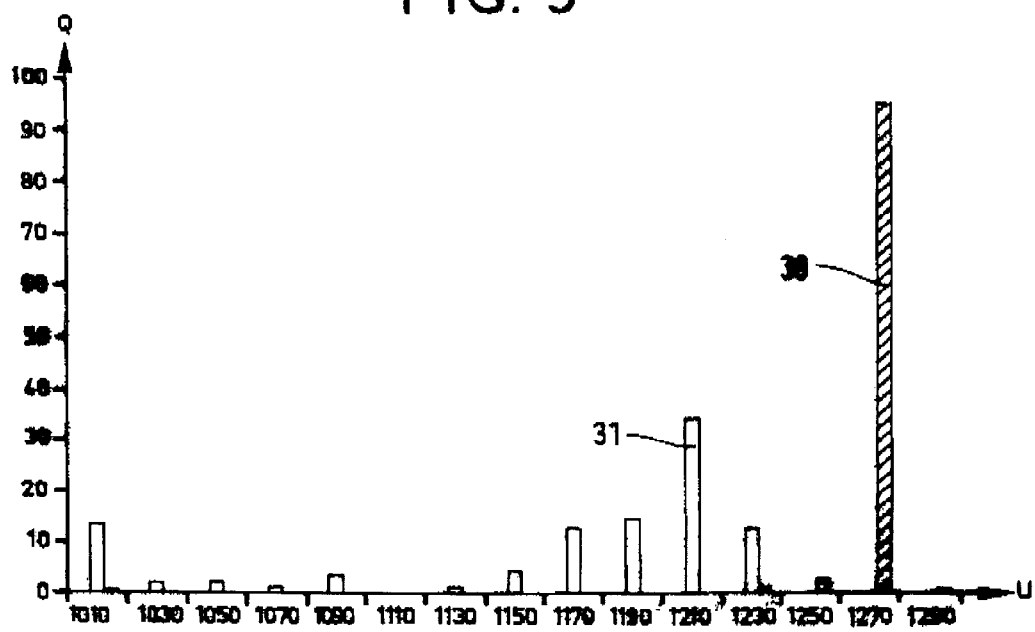
FIG. 5 is a histogram showing the voltages of cells of the invention are distributed at rest.

After they had been formed, the cells were charged to about 30% to 40% of their nominal capacity. They were then allowed to rest for 13 days at ambient temperature. Their voltages were then measured. The results are summarized in the form of a histogram shown in FIG. 5 and showing the quantity Q of cells as a percentage having the same voltage value U expressed in mV. Cells containing an A electrode or a B electrode, which gave results of the same order, are designated by reference 30, while the cells containing a C electrode are designated by reference 31.

It can be seen that practically all of the cells comprising an A electrode or a B electrode of the invention presented a voltage lying in the range 1.25 V to 1.30 V. In contrast, cells containing a C electrode had voltages that were lower and much more widely dispersed; a large proportion of these cells presented short circuits caused by the active material being displaced.

Cells containing A electrodes and C electrodes were then cycled under the following conditions:

charged to 0.5 Ic, where Ic is the current required for discharging the nominal capacity of the cell in 1 hour, until reaching a voltage drop—U of 1% beyond the maximum voltage reached;

discharging at 4 Ic to a voltage of 0.8 V per cell; and allowing to rest for a period of 30 min to 60 min.

Figure 6:
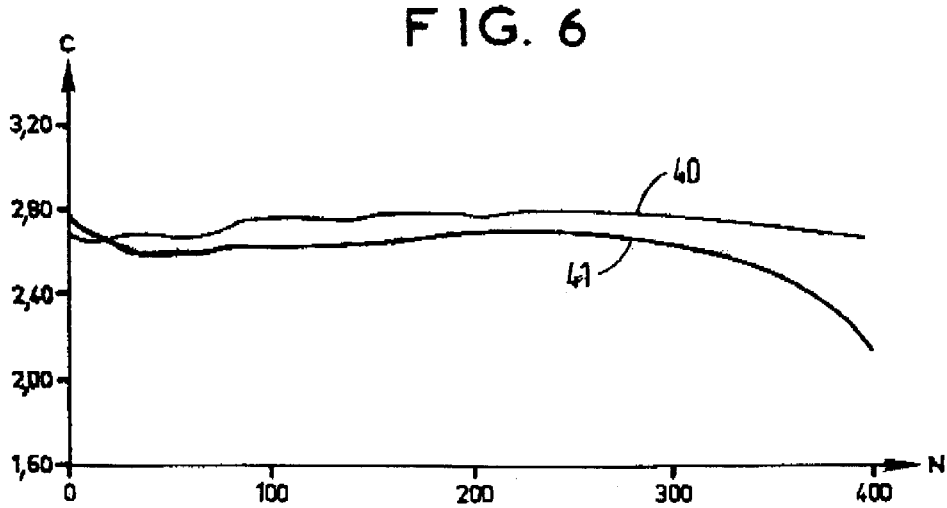
FIG. 6 shows curves representing cycling of electrodes of the invention.

FIG. 6 shows a curve 40 representing the cycling of A electrodes of the invention and a curve 41 representing the cycling of comparative C electrodes. Variation in capacity C is plotted up the ordinate in Ah as a function of the number of cycles N plotted along the abscissa. Beyond 300 cycles, it can be seen that the capacity of the cell containing the comparative C electrode (curve 41) deteriorates, while the capacity of the cell containing the A electrode of the invention (curve 40) varies little.

What is claimed is:

1. An electrode comprising a porous three-dimensional conductive support containing an electrochemically active material, said support having at least a first edge connected to a connection piece and at least a second edge substantially parallel to said first edge, and means for preventing said active material disposed along said second edge from moving, wherein said means is selected from the group consisting of: a piece having a U-shaped fold placed adjacent to and coextensive with said second edge; a covering deposited on a surface of said support and not penetrating said porous support; and treatment to modify the texture of said support.

2. An electrode according to claim 1, in which said piece is selected from the group consisting of a tape and a portion of a separator.

3. An electrode according to claim 2, in which said tape is constituted by an electrically insulating material.

4. An electrode according to claim 3, in which said material is selected from a polymer or a cellulose compound.

5. An electrode according to claim 2, in which said tape is made of metal.

6. An electrode according to claim 1, in which said piece is fixed to said electrode.

7. An electrode according to claim 1, in which said surface covering is deposited by spraying or by spreading.

8. An electrode according to claim 7, in which said covering is selected from the group consisting of: a polymer; an elastomer; a varnish; a paint; and a paraffin.

9. An electrode according to claim 1, in which said treatment is selected from the group consisting of: compression and welding.

10. An electrode according to claim 9, in which said treatment further comprises folding said second edge.

11. An electrode according to claim 1, in which said conductive support is selected from the group consisting of a foam and a felt.

12. An electrode according to claim 11, in which said conductive support is a nickel foam.

13. An electrode according to claim 1, in which said active material is a nickel hydroxide.

14. A secondary electrochemical cell including an electrode according to claim 1, in which said electrode is a nickel positive electrode.

15. A cell according to claim 14, wherein the cell is a nickel metal hydride cell.

* * * * *